(12) United States Patent     (10) Patent No.:     US 8,109,526 B2
Mason et al.                  (45) Date of Patent:    Feb. 7, 2012

(54) CONVERTIBLE A-FRAME CART

(75) Inventors: Grant Mason, Stephens City, VA (US);
    Thomas Perelli, Winchester, VA (US)

(73) Assignee: Rubbermaid Commercial Products, Inc., Winchester, VA (US)

(*) Notice: Subject to any disclaimer, the term of this patent is extended or adjusted under 35 U.S.C. 154(b) by 574 days.

(21) Appl. No.: 12/266,909

(22) Filed: Nov. 7, 2008

(65) Prior Publication Data

US 2009/0166999 A1    Jul. 2, 2009

Related U.S. Application Data

(60) Provisional application No. 60/996,316, filed on Nov. 9, 2007.

(51) Int. Cl.
    B62B 3/02    (2006.01)
(52) U.S. Cl. .................................. 280/47.35; 280/651
(58) Field of Classification Search ................. 280/79.7, 280/47.35, 651
    See application file for complete search history.

(56) References Cited

U.S. PATENT DOCUMENTS

| | | | | |
|---|---|---|---|---|
| 1,663,571 A * | 3/1928 | Shedd | ................. | 298/2 |
| 2,687,310 A * | 8/1954 | Goetz | ................. | 280/46 |
| 2,938,632 A * | 5/1960 | Mondineu | ................. | 108/106 |
| 3,436,092 A * | 4/1969 | Werner | ................. | 280/651 |
| 4,360,211 A * | 11/1982 | Blake | ................. | 280/79.7 |
| 4,867,465 A * | 9/1989 | Dunchock | ................. | 280/79.3 |
| 5,037,117 A * | 8/1991 | Hershberger | ................. | 280/79.7 |
| 5,163,695 A * | 11/1992 | Pakowsky | ................. | 280/79.7 |
| 5,762,348 A * | 6/1998 | Echternacht | ................. | 280/79.7 |
| 6,032,966 A * | 3/2000 | Young | ................. | 280/79.7 |
| 6,213,494 B1 * | 4/2001 | Liaw | ................. | 280/651 |
| 6,241,447 B1 * | 6/2001 | Echternacht | ................. | 414/11 |
| 6,296,262 B1 * | 10/2001 | Skinner | ................. | 280/79.7 |
| 6,349,962 B1 * | 2/2002 | Johanson | ................. | 280/651 |
| 6,450,514 B1 * | 9/2002 | Ronca | ................. | 280/79.11 |
| 6,454,282 B2 * | 9/2002 | Sexton et al. | ................. | 280/79.7 |
| 6,579,051 B2 * | 6/2003 | Echternacht | ................. | 414/11 |
| 6,637,761 B1 * | 10/2003 | Boettcher | ................. | 280/47.24 |
| 6,663,123 B1 * | 12/2003 | Kovacs | ................. | 280/79.7 |
| 6,694,896 B1 * | 2/2004 | Milazzo | ................. | 108/115 |
| 6,729,632 B2 * | 5/2004 | Ferrigan | ................. | 280/79.7 |
| 6,857,836 B2 * | 2/2005 | Keller | ................. | 414/11 |
| 7,004,483 B1 * | 2/2006 | McEntee | ................. | 280/47.35 |
| 7,325,817 B1 * | 2/2008 | Jankowski | ................. | 280/79.7 |

* cited by examiner

*Primary Examiner* — Jeffrey J Restifo
(74) *Attorney, Agent, or Firm* — Dennis J. Williamson; Moore & Van Allen, PLLC

(57) ABSTRACT

A cart comprises a first pillar that is mounted on a platform and defines first and second load supporting surfaces. A second pillar is mounted on the platform defining a third and fourth load supporting surfaces. The first and third load supporting surfaces are coplanar and the second and fourth load supporting surfaces are coplanar such that the first and second pillars form an A-frame support structure. Movable platforms are connected to the pillars and are movable between a raised position and a lowered position. When the movable platforms are in the lowered position, they are coplanar and form a support surface. Hangers are pivotably attached to the first pillar and are movable between a retracted position and an extended position.

15 Claims, 13 Drawing Sheets

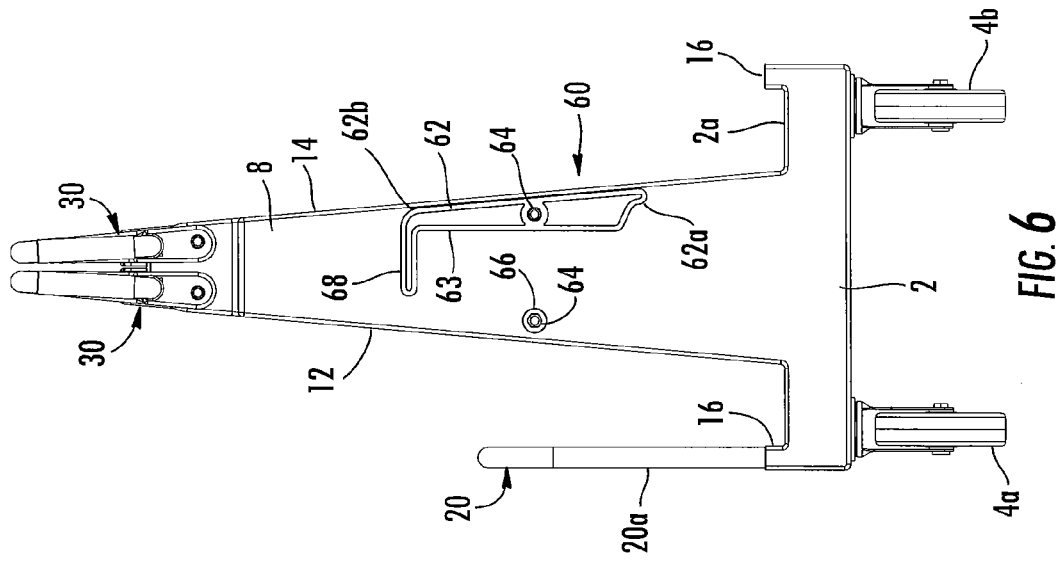
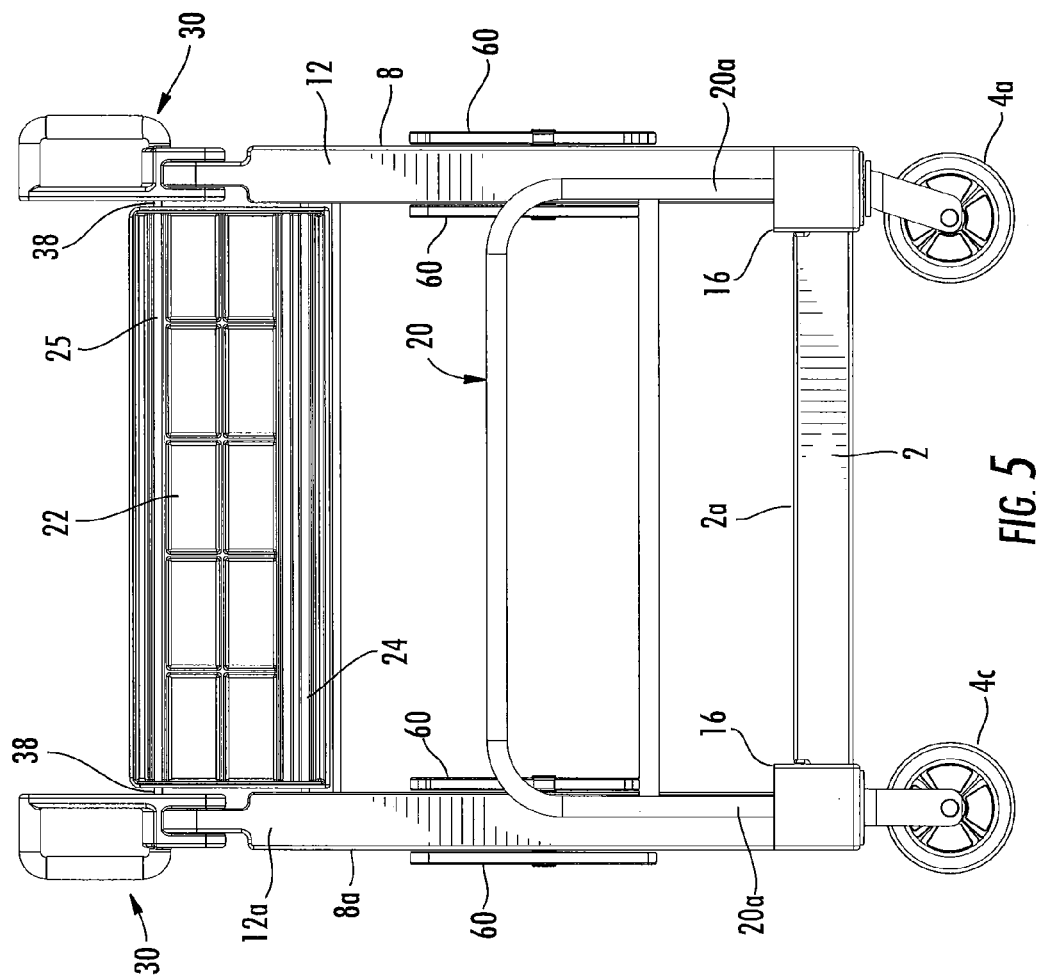

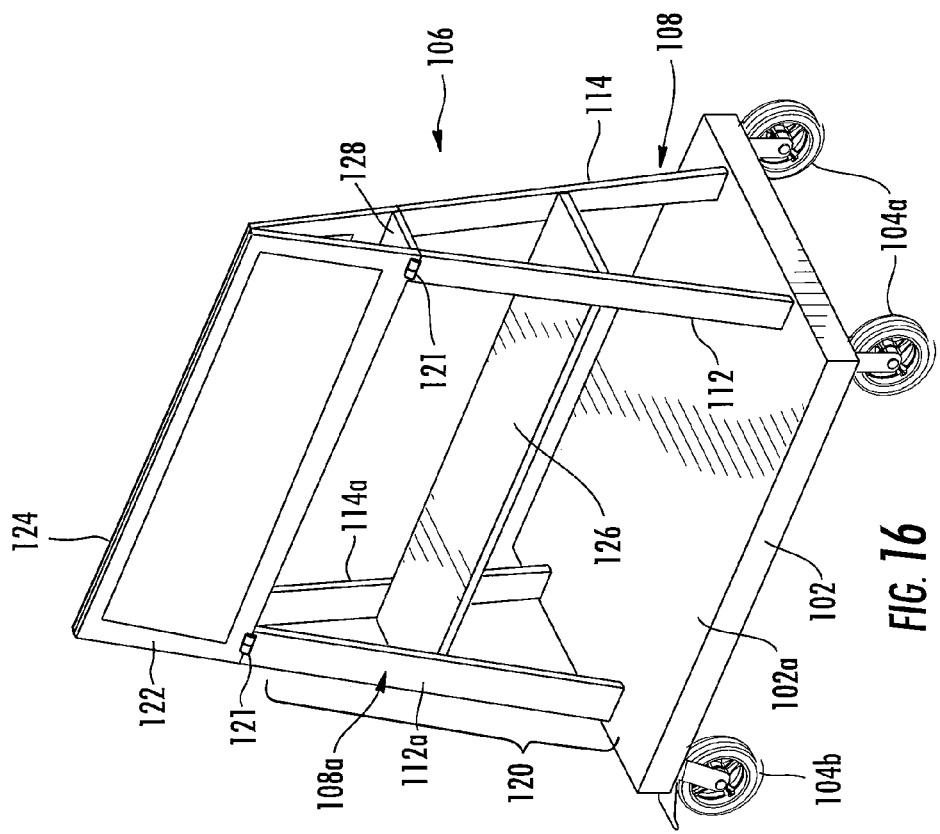
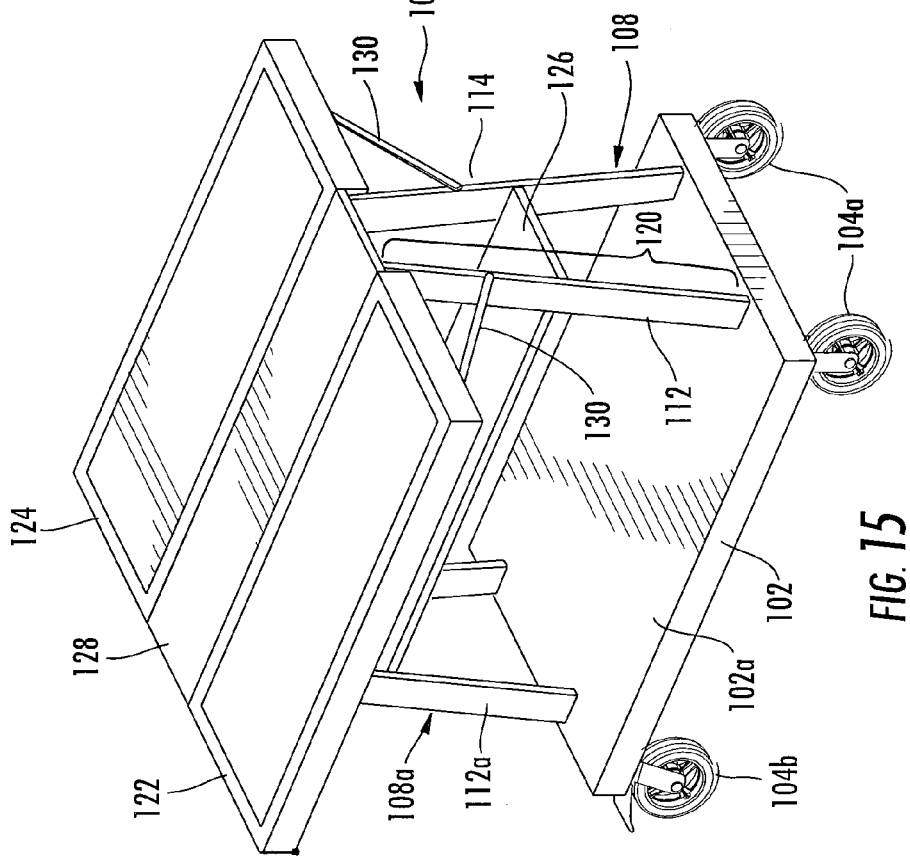

CONVERTIBLE A-FRAME CART

This application claims benefit of priority under 35 U.S.C. §119(e) to the filing date of to U.S. Provisional Application No. 60/996,316 as filed on Nov. 9, 2007, which is incorporated herein by reference in its entirety.

FIELD OF THE INVENTION

The invention relates generally to carts and, more particularly, to a cart that is convertible between an A-frame panel cart and a utility-type cart.

BACKGROUND OF THE INVENTION

Carts that are pushed or pulled for transporting a variety of materials in a wide variety of environments including, but not limited to, warehousing, maintenance, housekeeping, construction and the like are known. One type of cart is a utility cart. This type of cart typically comprises two or more vertically spaced platforms or shelves supported on four wheels. The utility cart typically has a handle at one or both ends for pushing or pulling the cart. In addition to transporting material, the top shelf of the cart may be used as a work surface. The typical utility cart includes shelves that may either have a flat surface or a flat surface surrounded by a raised lip.

Another type of cart is known as an A-frame cart or panel truck. The A-frame cart typically comprises a single platform that is arranged relatively low to the ground and is supported on four wheels. A fixed A-frame support structure is mounted on the platform to support large panels such as wall board, paneling, glass panes, or the like. One edge of the panels rests on the platform and the panel is leaned against the A-frame support structure such that it is supported in a substantially upright position.

Because these carts have different structures and are intended for different uses, it is necessary to purchase, maintain and store both types of carts in order to obtain the full benefits of each cart.

SUMMARY OF THE INVENTION

A cart comprises a platform mounted on a plurality of wheels for transport over a surface. A first pillar is mounted on the platform and defines a first load supporting surface and a second load supporting surface. A second pillar is mounted on the platform and defines a third load supporting surface and a fourth load supporting surface. The first load supporting surface and the third load supporting surfaces are coplanar and the second load supporting surface and the fourth load supporting surfaces are coplanar such that the first and second pillars form an A-frame support structure. A first movable platform is connected to the first and second pillars and is movable between a raised position and a lowered position and a second movable platform is also connected to the first and second pillars that is movable between a raised position and a lowered position. When the first movable platform and the second movable platform are in the lowered positions, the first movable platform and the second movable platform are coplanar and form a support surface. At least a first hanger is pivotably attached to the first pillar and is movable between a retracted position and an extended position. At least a second hanger is pivotably attached to the second pillar and is movable between a retracted position and an extended position. The hangers have support surfaces that are coplanar when the hangers are in the extended position.

BRIEF DESCRIPTION OF THE DRAWINGS

FIG. 5 is a side view of the cart of FIG. 1 in the second configuration.

FIG. 6 is an end view of the cart of FIG. 1 in the second configuration.

FIG. 15 is a perspective view of another embodiment of the cart of the invention in a first configuration.

FIG. 16 is a perspective view of the cart of FIG. 15 in a second configuration.

DETAILED DESCRIPTION OF PREFERRED EMBODIMENTS OF THE INVENTION

Figure 1:
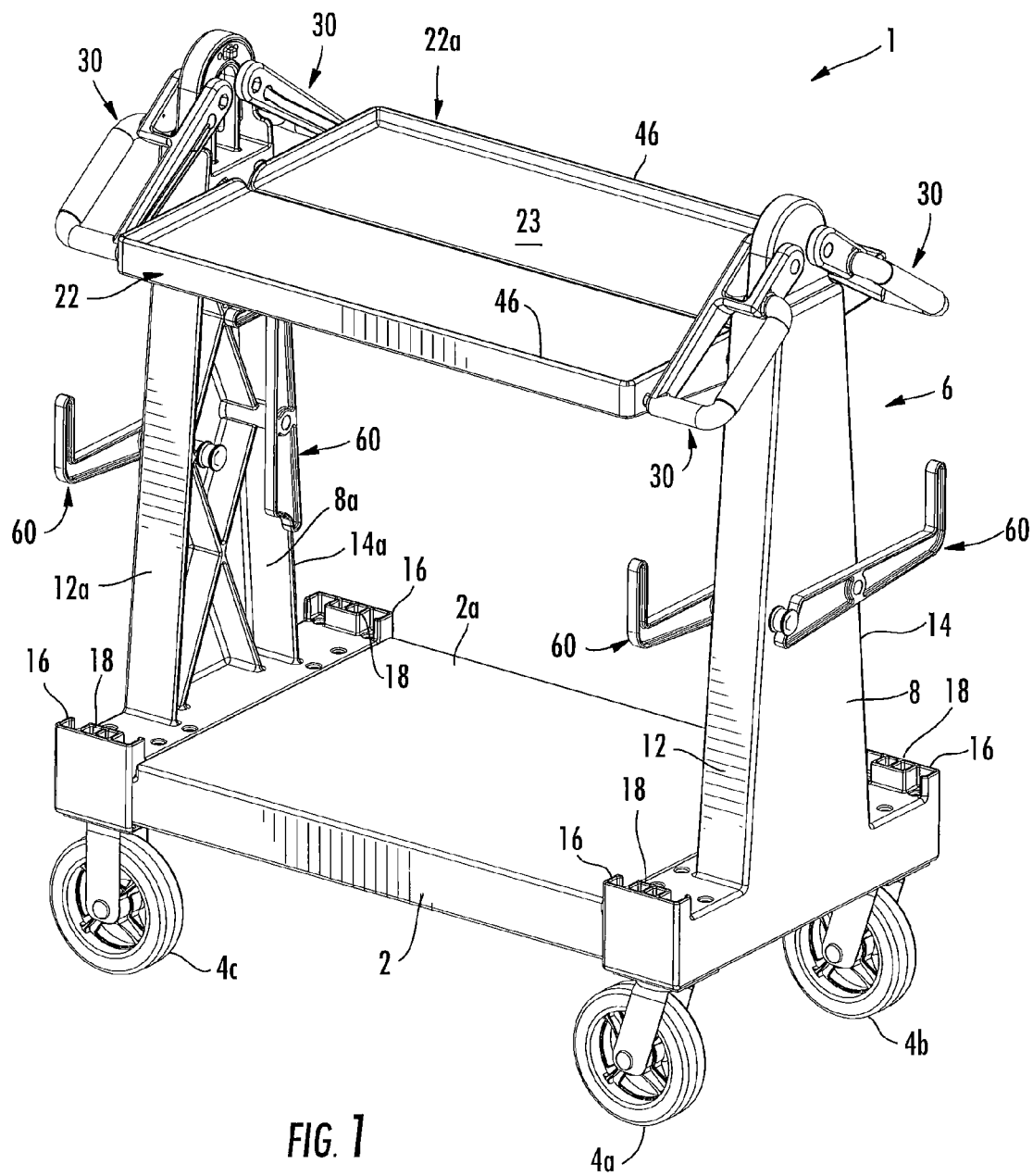
FIG. 1 is a perspective view of an embodiment of the cart of the invention in a first configuration.

Referring to FIGS. 1 through 8, the cart of the invention is shown generally at 1 in the figures and includes a first platform 2. The platform 2 has a load supporting surface 2a and is supported on wheels 4a-4d. In the illustrated embodiment four wheels are used to provide a stable platform where the wheels 4a and 4b are caster wheels that can pivot about a vertical axis to facilitate turning of the cart and wheels 4c and 4d may be "fixed" wheels such that they do not rotate about a vertical axis. More than four wheels may also be used and all of the wheels may be caster wheels. The platform 2 may have any suitable dimensions although it is contemplated that the platform 2 will have a length and width similar to that of typical utility carts.

The platform 2 supports a convertible A-frame support structure 6 that extends vertically from the platform 2. The A-frame support structure 6 includes a first pillar 8 arranged at one end of platform 2 and a second pillar 8a arranged opposite to the first pillar 8 at the second end of the platform 2. The pillars 8 and 8a may be centrally located along the platform 2. Pillar 8 defines a first load supporting surface 12 and a second load supporting surface 14 and pillar 8a defines a first load supporting surface 12a and a second load supporting surface 14a. Surfaces 12 and 12a are in a common plane and surfaces 14 and 14a are in a common plane.

Figure 8:
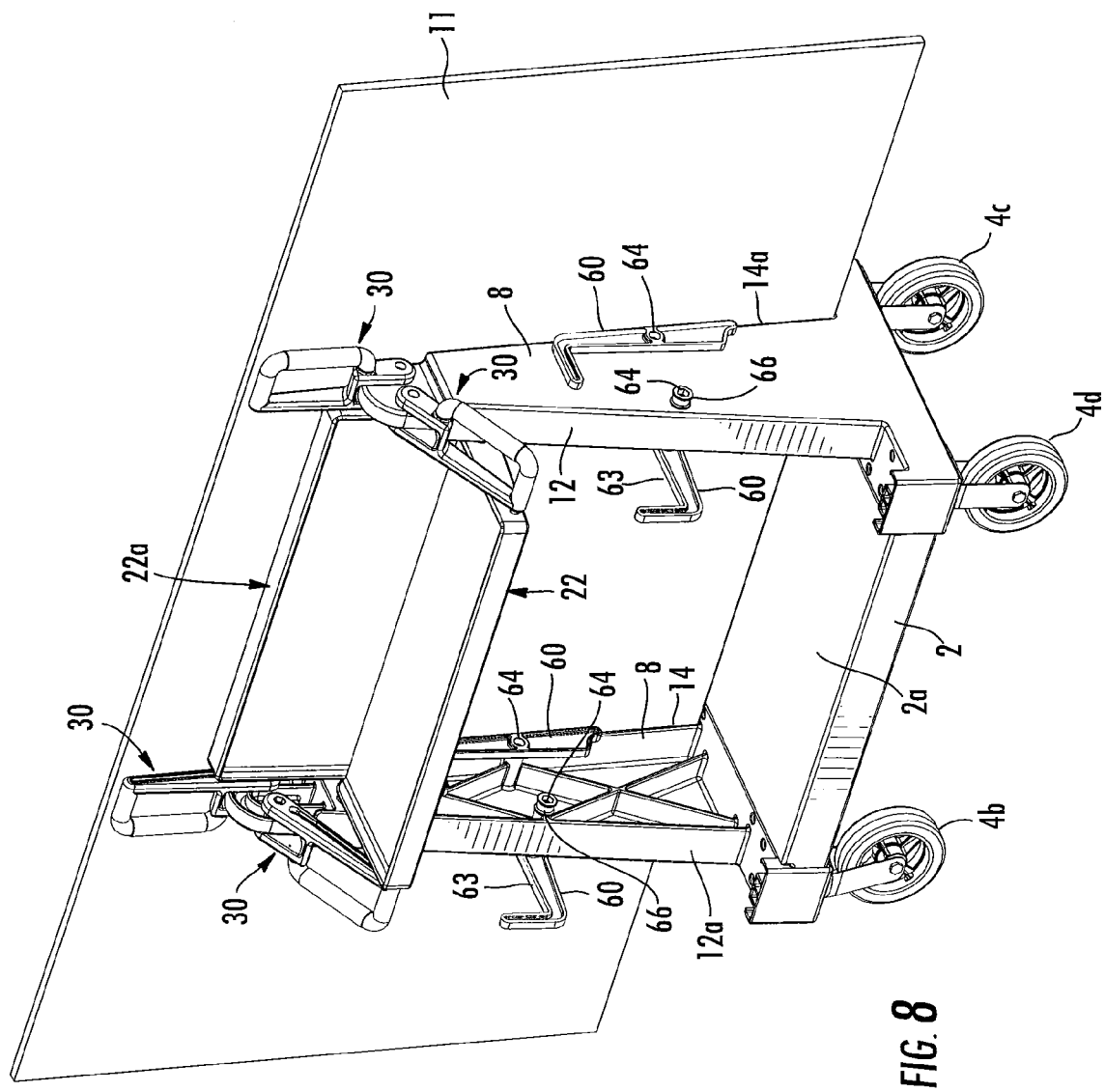
FIG. 8 is a perspective view of the cart of FIG. 1 in the third configuration holding a load.

A load 11 such as a panel of wall board, plywood, pane of glass, paneling or the like may be supported on the cart by resting a first side edge of the panel 11 on the load supporting surface 2a of platform 2 and leaning the panel against surfaces 12 and 12a or 14 and 14a, as shown in FIG. 8. Additional panels may be supported on platform 2 and leaned against the first panel. The angle of the load supporting surfaces 12, 12a, 14 and 14a relative to vertical is selected such that the panels are supported in a substantially vertical orientation but at an angle sufficient to prevent the panels from tipping over or sliding away from the load supporting surfaces 12, 12a and 14, 14a. In one embodiment, the load supporting surfaces are angled relative to vertical approximately 5 degrees.

To prevent the lower edge of the panels from sliding away from the load supporting surfaces 12, 12a and 14, 14a, raised stops 16 are provided along the lateral edges of platform 2. The stops 16 may also include apertures 18 for removably receiving rails 20, as shown in FIGS. 4 through 7. Rails 20 are formed with vertical members 20a that are inserted into the apertures 18. Pins or other locking members may used to lock the vertical members 20a in the apertures.

Figure 7:
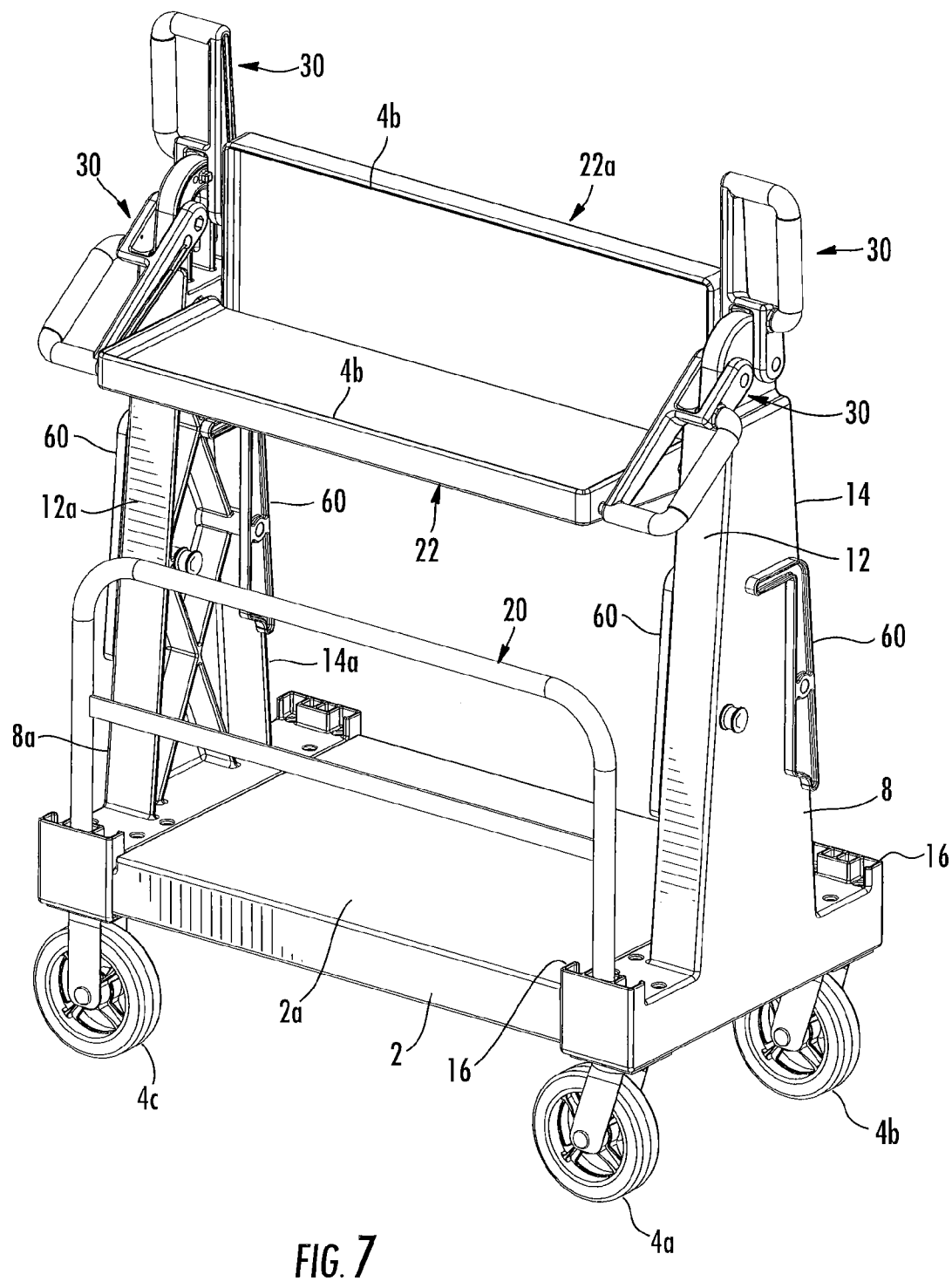
FIG. 7 is a perspective view of the cart of FIG. 1 in a third configuration.

A first movable platform 22 and a second movable platform 22a are mounted between pillars 8 and 8a such that they can pivot relative to the pillars along an axis parallel to the longitudinal axis of the cart to change the configuration of the cart. The platforms 22 and 22a can assume the raised position shown in FIGS. 4, 5 and 6 where the platforms are substantially vertical or the lowered position shown in FIGS. 1, 2 and 3 where the platforms are substantially horizontal. In the lowered position the platforms 22 and 22a create horizontal load supporting surfaces. Further, one platform may be in the raised position and the other platform in the lowered position as shown in FIGS. 7 and 8.

Figure 3:
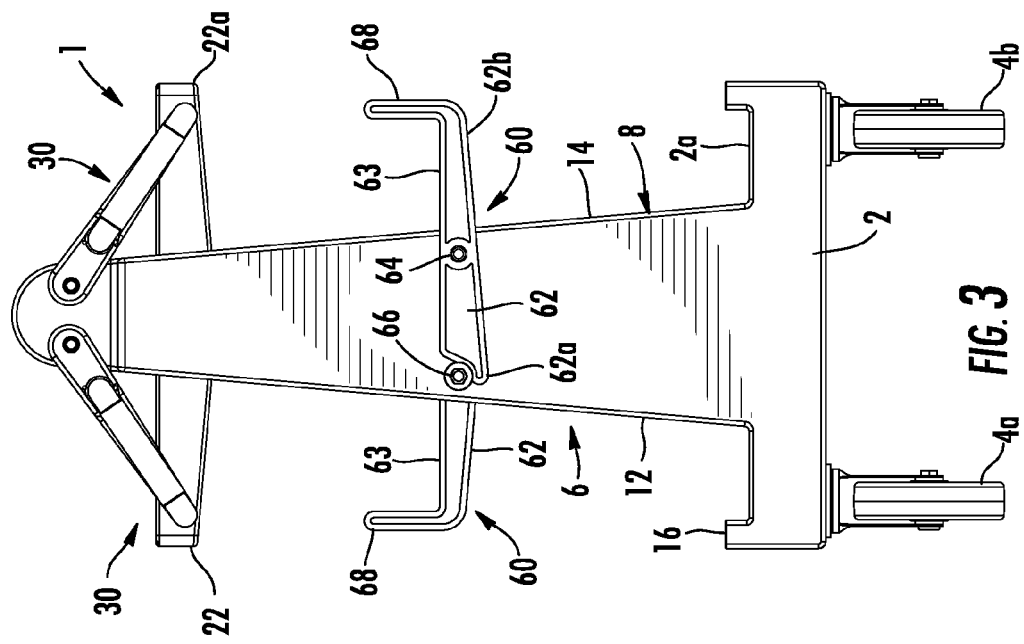
FIG. 3 is an end view of the cart of FIG. 1 in the first configuration.
Figure 2:
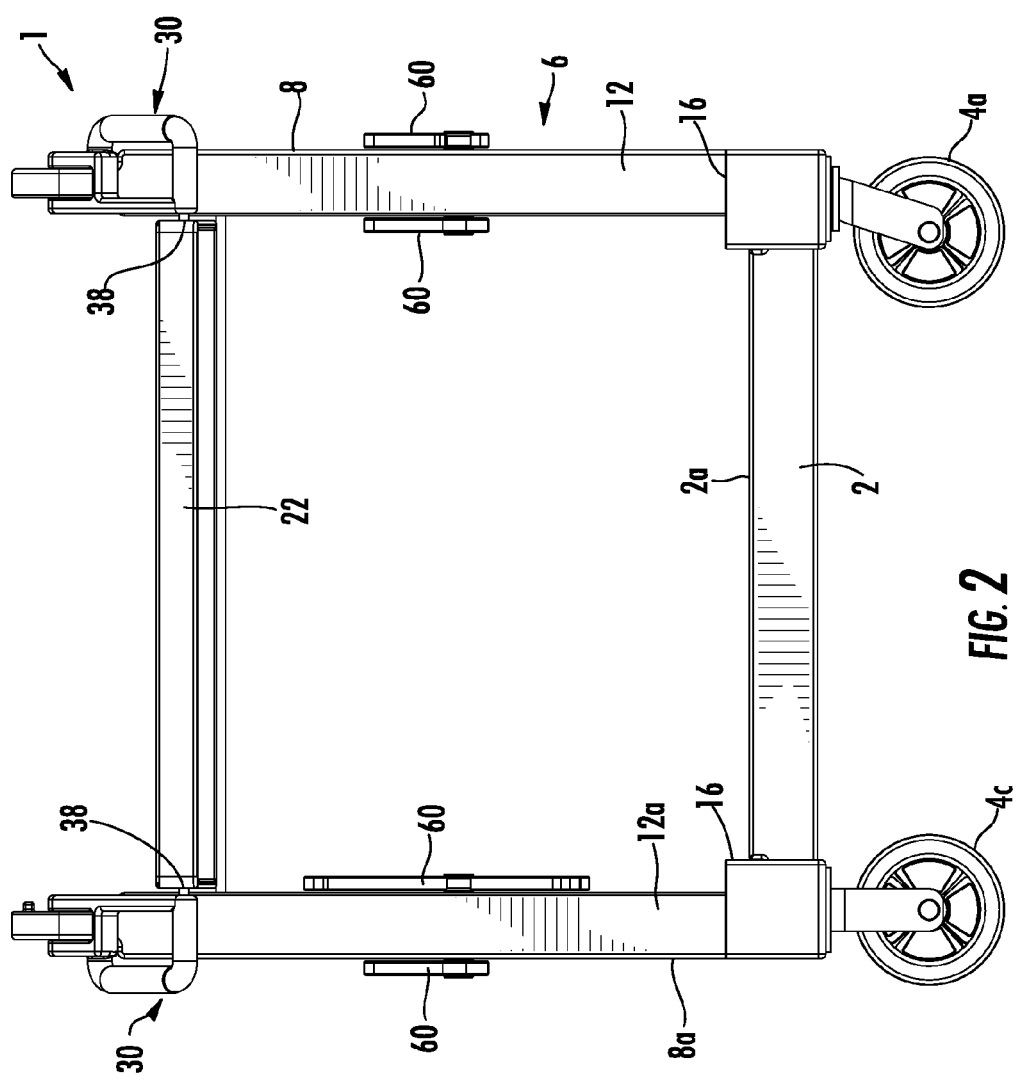
FIG. 2 is a side view of the cart of FIG. 1 in the first configuration.
Figure 4:
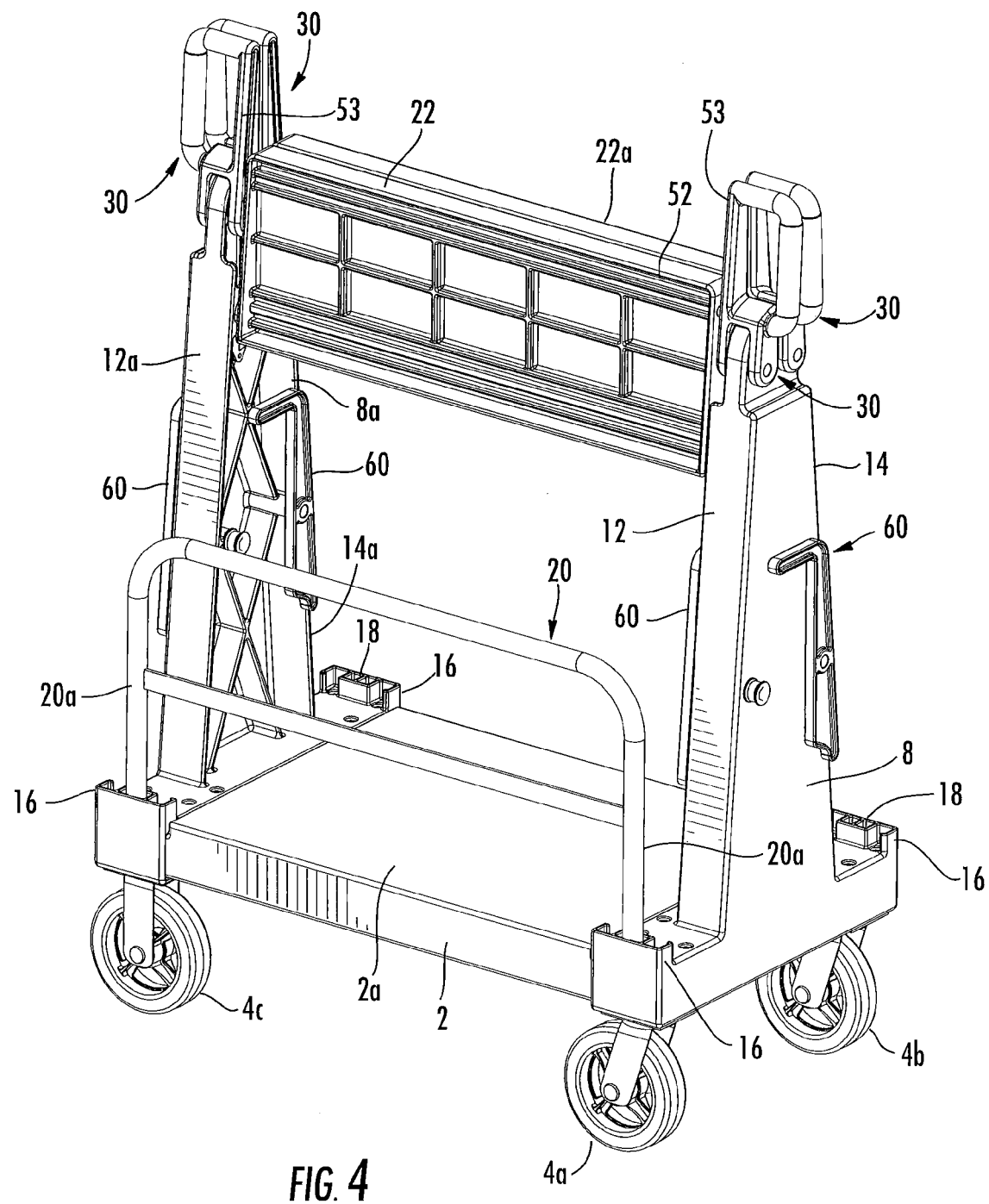
FIG. 4 is a perspective view of the cart of FIG. 1 in a second configuration.
Figure 9:
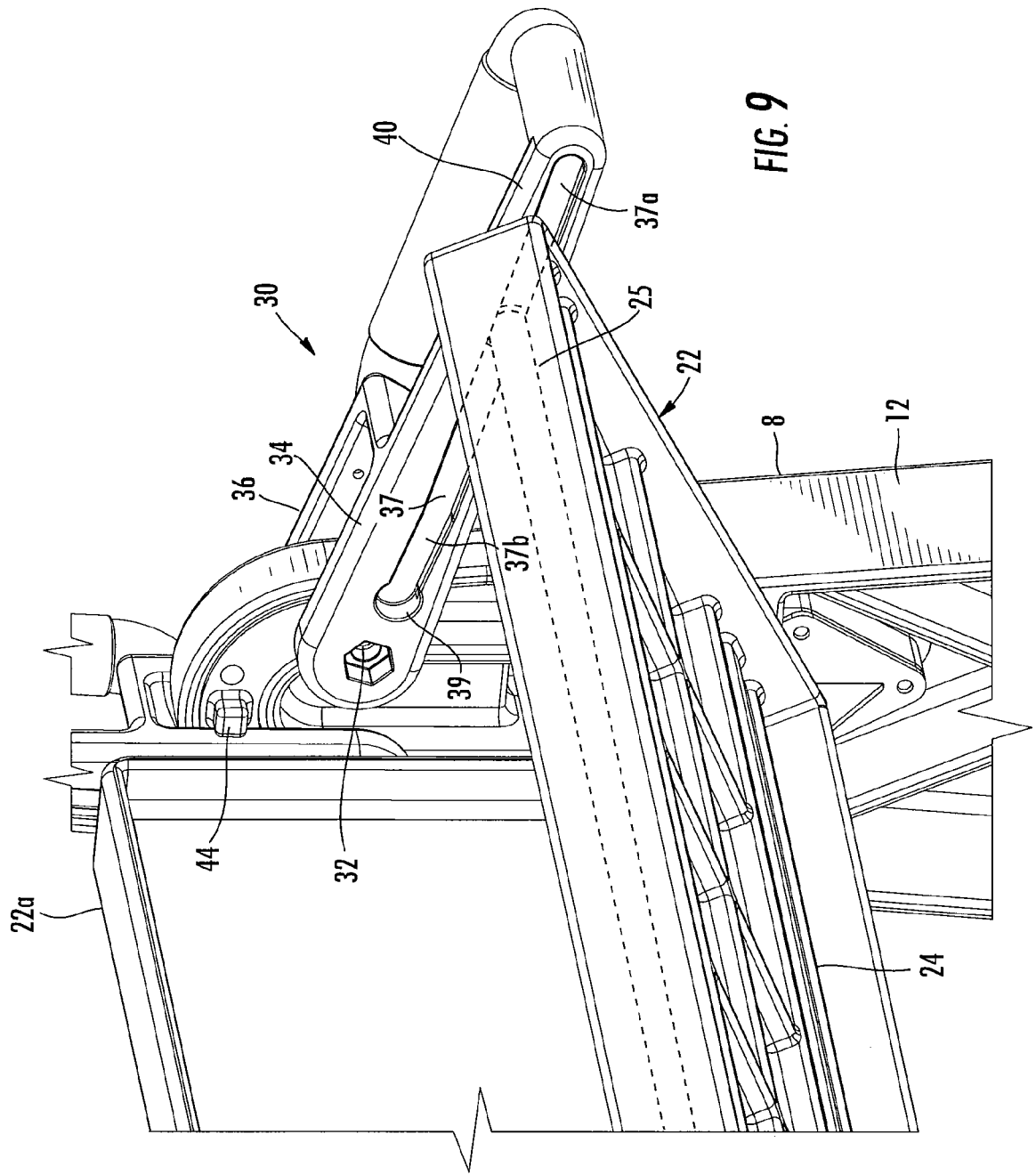
FIGS. 9 and 10 are detailed partial perspective views of the cart of FIG. 1.
Figure 10:
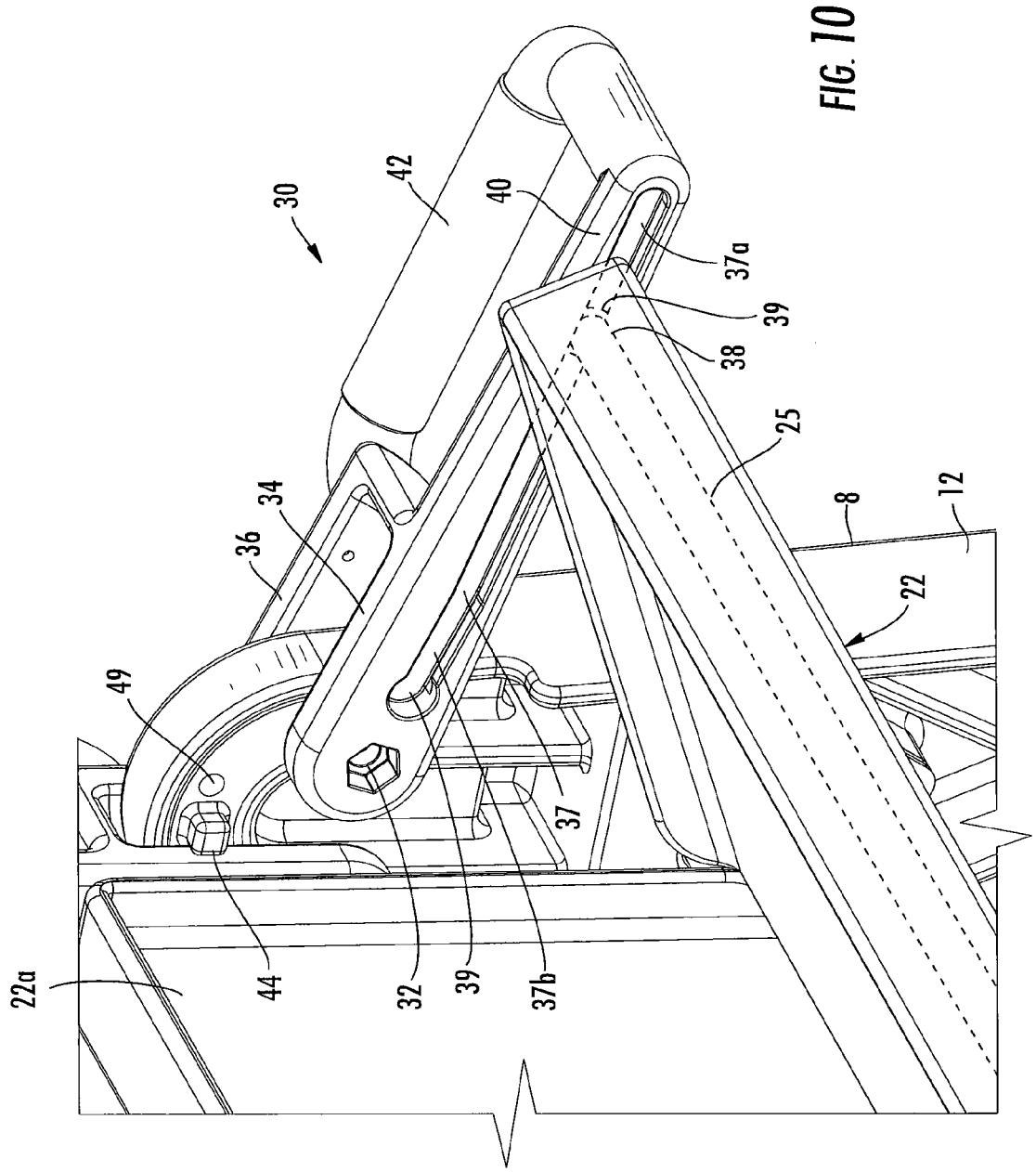

The mechanism for mounting the platforms 22 and 22a to the pillars 8 and 8a is the same for both platforms such that specific reference will be made to platform 22. Referring to FIGS. 9 and 10, a rod 24 extends between and may be fixed in pillars 8 and 8a. The platform 22 is mounted on the rod 24 such that the platform 22 rotates relative to the rod 24 between the raised position, as shown in FIGS. 4 through 6 where the platforms are substantially vertical, to the lowered position, as shown in FIGS. 1 through 3 where the platforms are substantially horizontal. The rod 24 may also be supported in bearings formed in pillars 8 and 8a such that the rod 24 rotates about its longitudinal axis with the platform 22 mounted on the rod 24 such that the platform 22 rotates with the rod 24.

To control the rotation and positioning of the platforms, a platform adjustment assembly 30 is provided at each end of platforms 22 and 22a. Each platform adjustment assembly 30 has one end pivotably mounted to the pillar at pivot pin 32 such that the adjustment assembly 30 pivots about an axis parallel to rod 24. In the illustrated embodiment the adjustment assembly 30 includes a first flange 34 and a second flange 36 that receive the upper end of the pillar therebetween.

The pivot pin 32 extends through the pillar and into each flange 34 and 36 such that the adjustment assembly 30 is stably supported. The adjustment assembly 30 includes an arm 40 that defines an elongated slot 37.

Slot 37 receives the end 38 of a second rod 25 that is located at the distal end of the platform remote from rod 24. Rod 25 extends between adjustment assemblies 30 on pillars 8 and 8a to support the distal end of the platform 22. The end 38 of rod 25 can slide in slot 37 relative to the arm 40. In the illustrated embodiment, the end 38 of rod 25 includes an enlarged head 39 that is trapped in a groove behind slot 37 such that the rod 25 is constrained to movement in the slot 37. A handle 42 is formed on the adjustment assembly 30 that be gripped by a user to rotate the platform 22 between the raised position and the lowered position. The handles 42 can also be gripped to move the entire cart.

To rotate the platform 22 from the raised position to the lowered position, the handle 42 may be gripped and rotated from the raised position to the lowered position. Alternatively, the platform 22 may be gripped and rotated from the raised position to the lowered position. As the platform 22 moves from the raised position to the lowered position, end 38 of rod 25 slides in slot 37 toward the distal end of arm 40. The length of the slot 37 is selected such that when the end 38 of rod 25 reaches the distal end 37a of the slot 37, the platform 22 is in a substantially horizontal position.

To rotate the platform from the lowered position to the raised position, either the handle 42 or platform 22 is gripped and rotated from its lowered position to the raised position. As the platform 22 moves from the lowered position to the raised position, the end 38 of rod 25 slides in slot 37 toward the proximal end 37b of slot 37. A stop 44 is provided on the pillars to limit rotation of the platform 22 and adjustment assembly 30. A ball and detent may be provided to secure the shelf in the raised position. For example, a detent 49 may be located on the pillar that is engaged by a spring biased ball located on flange 34. A similar structure may be used to secure the shelf in the horizontal position. The ball and detent may be replaced by a locking pin that engages mating holes formed on the adjustment assembly 30 and the pillars. Other releasable locking mechanisms may also be used.

The first and second platforms 22 and 22a are mounted in the same manner and at the same height on the pillars 8 and 8a such that when both platforms are in the lowered position, the platforms 22 and 22a create a single continuous platform surface 23 as shown in FIG. 1. The upper surfaces of platforms 22 and 22a may include a raised lip 46 such that the platform surface 23 includes a peripheral lip when both platforms 22 and 22a are in the lowered position.

Referring to FIG. 4, in the raised position, the bottom surface 52 of the platforms 22 and 22a and the bottom surfaces 53 of the adjustment assemblies 30 may be coplanar with the surfaces 12, 12a and 14, 14a such that the bottom surfaces of the platforms and adjustment assemblies provide additional support surfaces for the loads 11 when the loads lean against load supporting surfaces 12, 12a and 14, 14a as shown in FIG. 8. While the bottom surfaces of the adjustment assemblies 30 and platforms 22 and 22a are shown to be coplanar with the support surfaces 12, 12a and 14, 14a these elements may be other than coplanar provided they do not interfere with the ability of the load to rest against the load supporting surfaces 12, 12a and 14, 14b.

Hangers 60 are provided on the pillars. Referring to FIG. 3, each hanger 60 comprises an elongated member 62 pivotably mounted to the side of pillars 8 and 8a at pin 64. A stop 66 is fixed to the pillar opposite to the pivot pin 64. In one embodiment the pin that rotatably supports one hanger 60 also supports the stop 66 of the hanger 60 mounted on the opposite side of the same pillar. The member 62 can be rotated from an extended position as shown in FIG. 3 to a retracted position as shown in FIG. 6. In the extended position one end 62a of the elongated member 62 is positioned below and in abutting engagement with the stop 66. The opposite end 62b of the elongated member 62 extends beyond the side of the pillars 8, 8a to create a surface 63 for supporting a load. The end 62b of the elongated member 62 is formed with an upturned flange 68 that retains the load on the hangers. The weight of the member 62 and the load supported on the hanger 60 force the end 62a of the member against stop 54 to maintain the member 62 in the extended position. In the retracted position the hangers 60 are rotated behind the load supporting surfaces 12, 12a and 14, 14a so as to not interfere with the supporting of a planar load 11. The hangers may be retained in the retracted and/or extended position by a ball and detent, locking pin or other mechanism.

In the illustrated embodiment the hangers 60 are arranged in pairs that may be used to support long loads that extend across the pairs of hangers. Specifically, one hanger of the first hanger pair is mounted to the outside of the pillar 8 and the second hanger of the first hanger pair is mounted to the inside of the other pillar 8a such that the load supporting surfaces 63 are coplanar when the hangers are in the extended position. Likewise, one hanger of the second hanger pair is mounted to the outside of the pillar 8a and the second hanger of the second hanger pair is mounted to the inside of the other pillar 8. The hangers of the first hanger pair extend to one side of pillars 8 and 8a and the hangers of the second hanger pair extend to the opposite side of the pillars 8 and 8a. It will be appreciated that the hangers may be mounted in pairs other than as illustrated. For example, the two hangers of the pair may both be mounted to the inside of the pillars or both may be mounted to the outside of the pillars.

Figure 11:
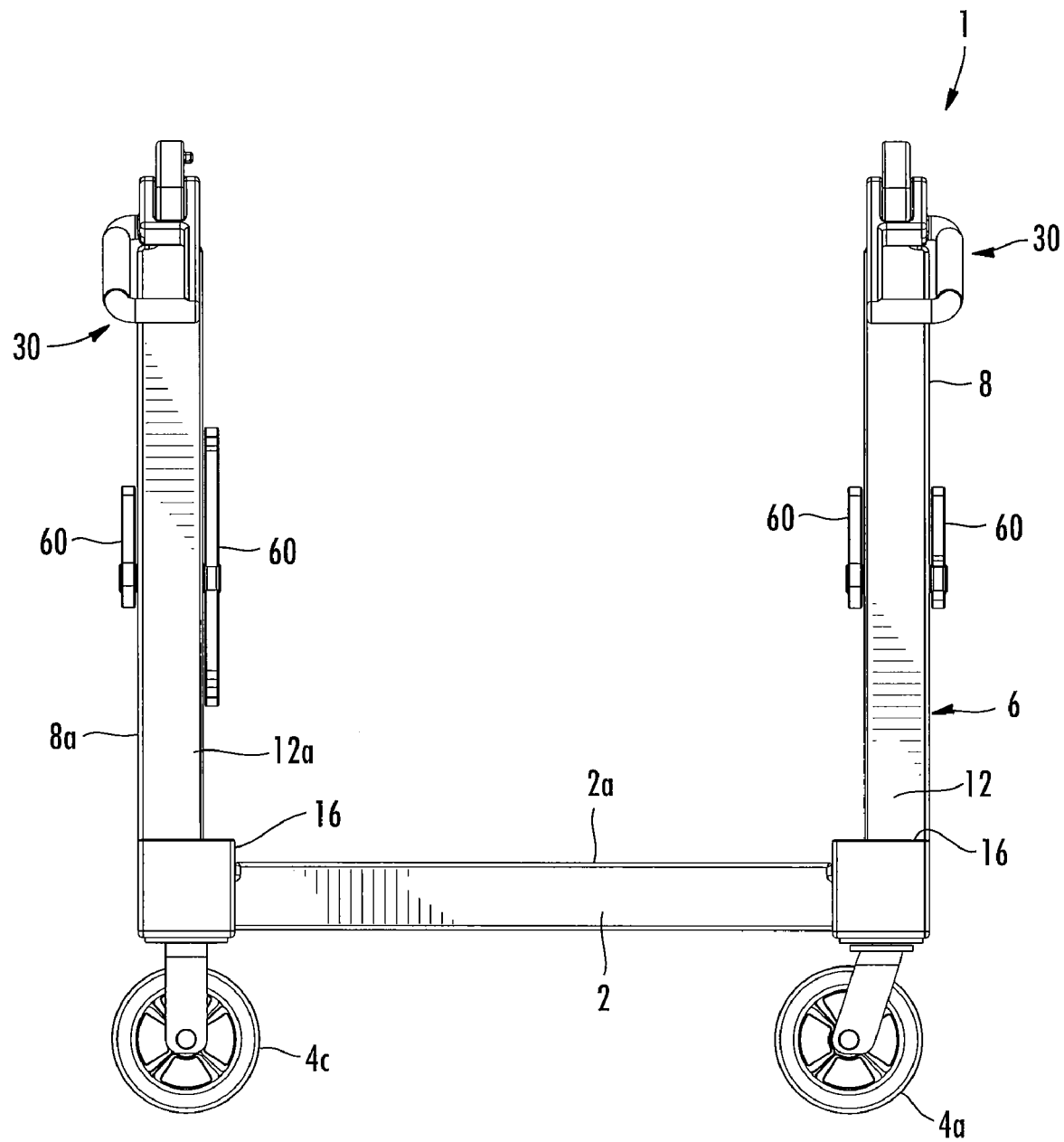
FIGS. 11 through 14 are perspective views showing the cart of FIG. 1 in different configurations.

The platforms 22 and 22a may be removably mounted to the pillars such that they can be removed completely from the cart. Pin 38 can be removed from slot 37 through enlarged opening 39 that allows the enlarged head of pin 38 to be withdrawn from the slot. Rod 24 can also be removed from the pillars 8 and 8a such that the platforms 22 and 22a are completely removable from the cart as shown in FIG. 11. Further, the cart may use only a single movable shelf 22 with shelf 22a removed or eliminated completely.

Figure 12:
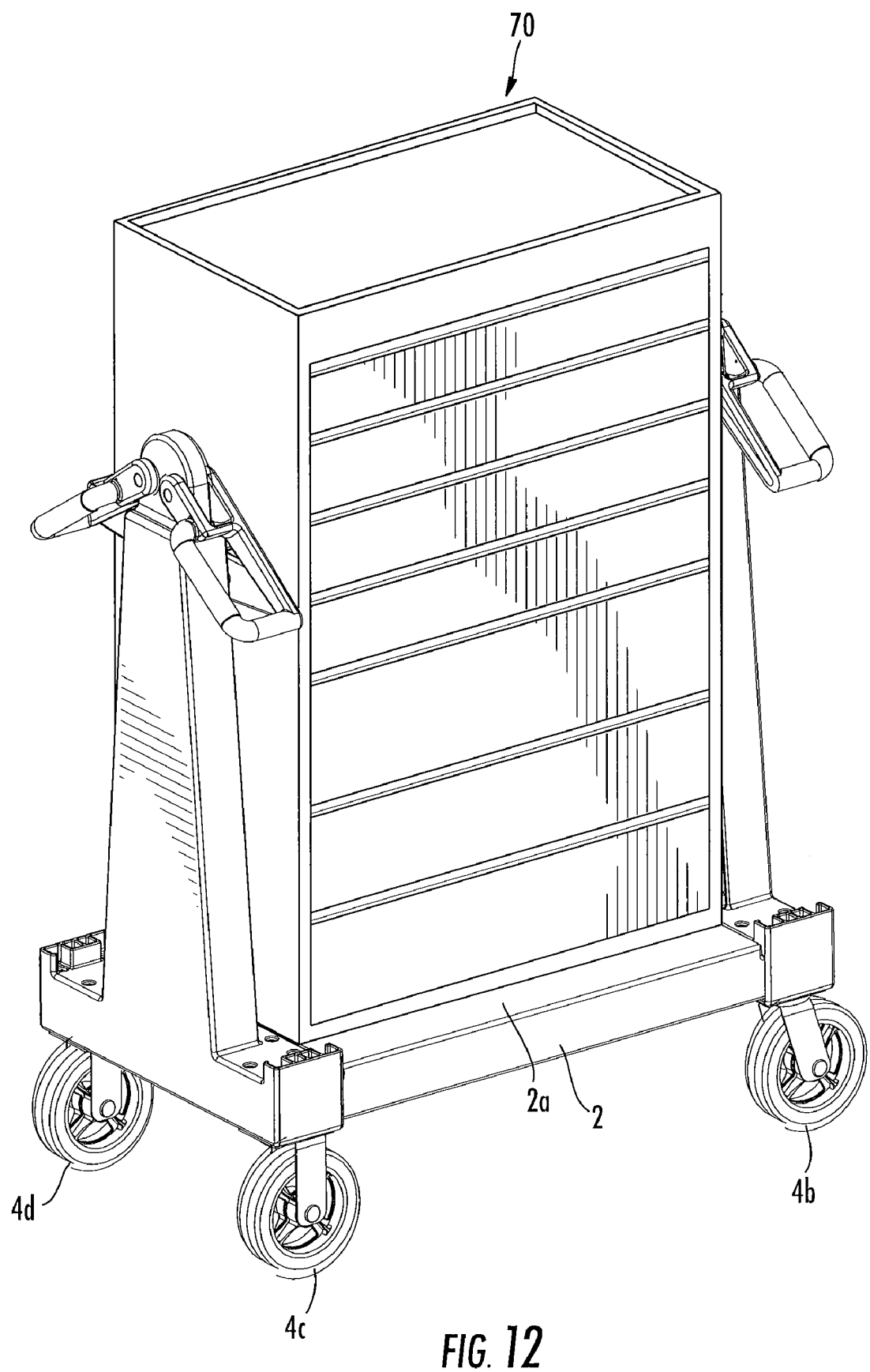
Figure 13:
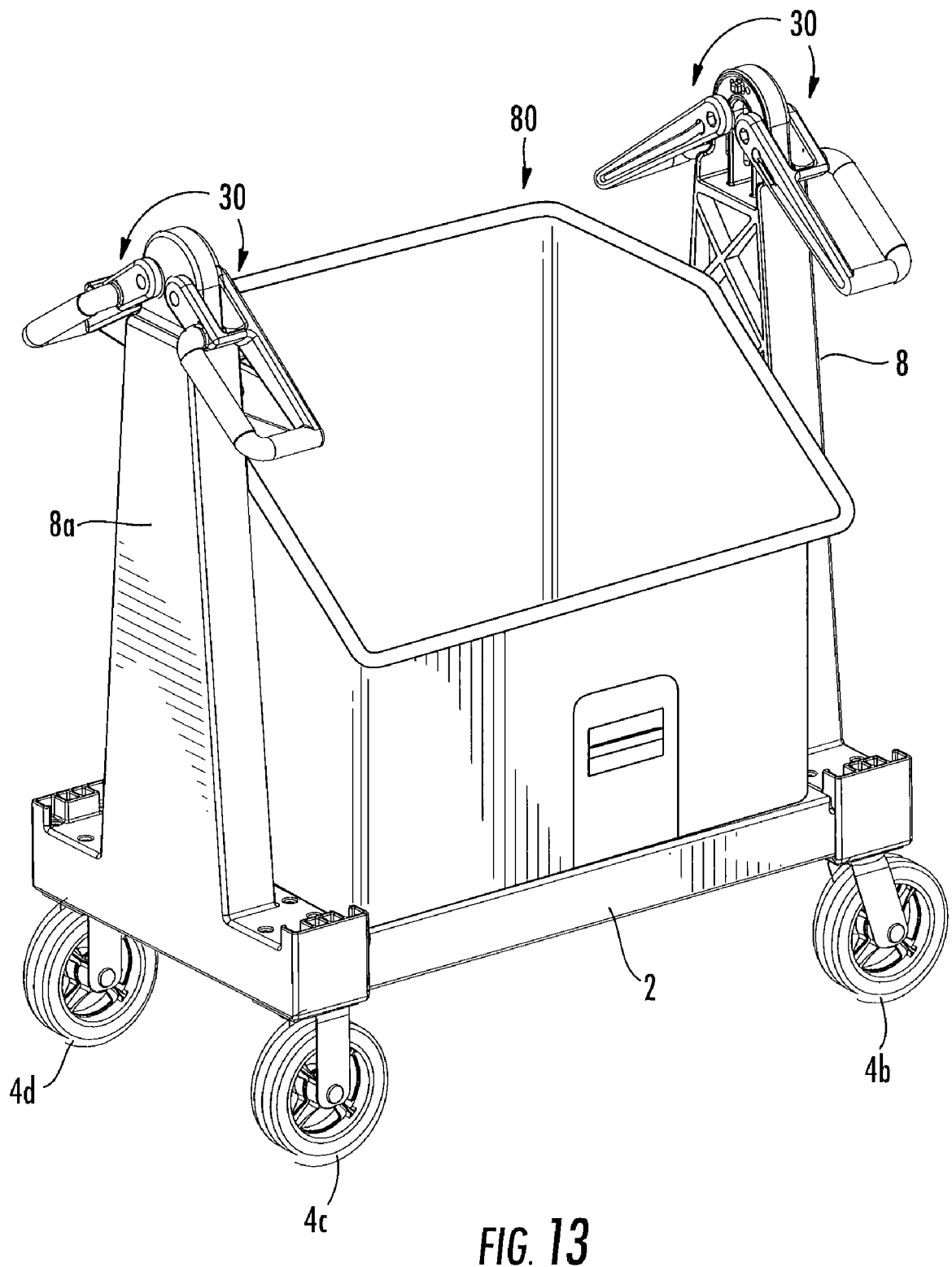
Figure 14:
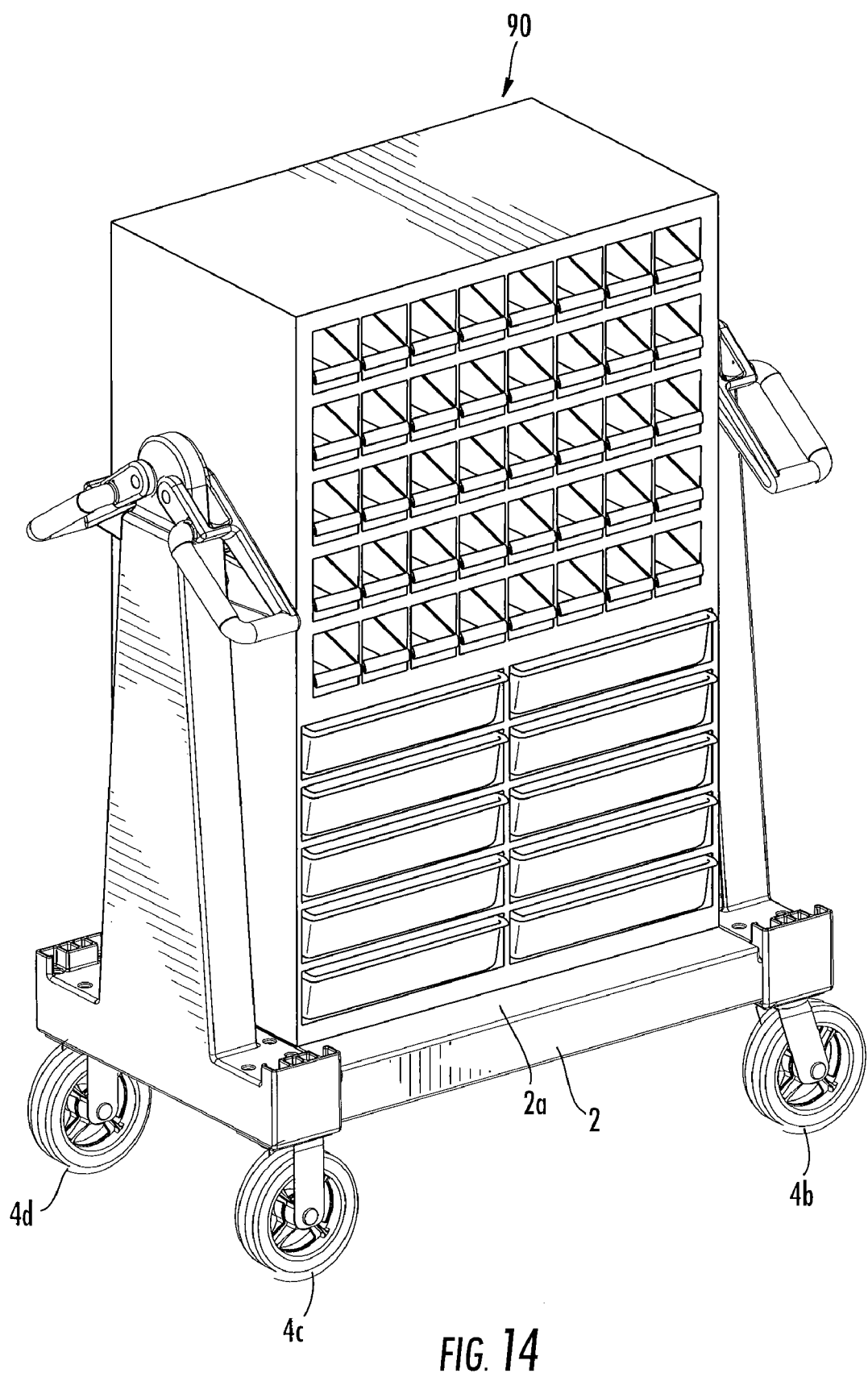

Once the platforms 22 and 22a are removed a variety of storage systems can be removably mounted on the platform 2 to convert the cart for specialized applications. A tool cart 70 can be mounted on platform 2 as shown in FIG. 12. The tool cart comprises a plurality of drawers and/or cabinets for retaining tools or other equipment. A bulk bin 80 can be mounted on platform 2 as shown in FIG. 13. The bin comprises an open, large capacity receptacle for retaining bulk items. A parts bin 90 can be mounted on platform 2 as shown in FIG. 14. The parts bin comprises a plurality of drawers and/or cabinets for parts or other components or equipment. Other storage systems may also be removably mounted on platform 2.

An alternate embodiment of the cart of the invention is shown in FIGS. 15 and 16. The cart includes a first platform 102. The platform 102 has a load supporting surface 102a and is supported on front wheels 104a and back wheels 104b. In the illustrated embodiment four wheels are used to provide a stable platform where the wheels 104b are caster wheels that can pivot about a vertical axis to facilitate turning of the cart. More than four wheels may also be used.

The platform 102 supports an A-frame support structure 106 that extends vertically from the platform 102. The A-frame support structure 106 includes a first pillar 108 arranged at one end of platform 102 and a second pillar 108a arranged opposite to the first pillar 108 at the second end of the platform 102. The pillars 108 and 108a may be centrally located along the platform 102. Pillar 108 defines a first load supporting surface 112 and a second load supporting surface 114 and pillar 108a defines a first load supporting surface 112a and a second load supporting surface 114a. Surfaces 112 and 112a are in a common plane and surfaces 114 and 114a are in a common plane.

A member such as a panel of wall board, plywood, pane of glass, paneling or the like is supported on the cart by resting a first side edge of the panel on the load supporting surface 102a of platform 102 and leaning the panel against surfaces 112 and 112a (or 114 and 114a). Additional panels may be supported on platform 12 and leaned against the first panel. The angle of the load supporting surfaces 112, 112a, 114 and 114a relative to vertical is selected such that the panels are supported in a substantially vertical orientation but at an angle sufficient to prevent the panels from tipping over or sliding away from the load supporting surfaces 112, 112a and 114, 114a.

Each pillar 108 and 108a includes a stationary bottom section 120 connected to movable top sections 122 and 124. The top sections 122 and 124 can pivot relative to the bottom section 120 at hinges 121 such that the top sections can move between a raised position and a lowered position. In the raised position, as shown in FIG. 16, the movable top sections 122 and 124 form part of the load supporting surfaces 112, 112a and 114, 114a. In the raised position movable top sections 122 and 124 may be locked in place such as by a locking pin or other locking device. In the lowered position, as shown in FIG. 15, the movable top sections 122 and 124 are in a horizontal position and form an upper platform surface. In the lowered position the movable top sections 122 and 124 create horizontal load supporting surfaces.

The stationary bottom section 120 includes a first shelf 126 and a second shelf 128. The second shelf 128 is located at the hinge between the bottom section 120 and the movable top sections 122 and 124 such that when the movable sections 122 and 124 are positioned in the horizontal position, the second shelf 128 is positioned between and coplanar with the movable sections such that the movable sections 122 and 124 and shelf 128 form a continuous surface that forms the upper shelf. A lock 130 locks the movable sections 122 and 124 in the horizontal position. The lock 130 may comprise a rigid elongated member that extends between the bottom section 120 and movable sections 122 and 124, a hinged brace or other locking member.

While embodiments of the invention are disclosed herein, various changes and modifications can be made without departing from the spirit and scope of the invention as set forth in the claims. One of ordinary skill in the art will recognize that the invention has other applications in other environments. Many embodiments are possible.

The invention claimed is:

1. A cart comprising:
a first platform,
a support structure on said first platform defining a first load supporting surface disposed at an acute angle relative to vertical to support a load that rests on the first platform and a second load supporting surface disposed at an acute angle relative to vertical to support a load that rests on the first platform;
a first movable platform connected to said support structure, said first movable platform movable between a raised position such that a load may be supported on the first side of the first movable platform and the first load supporting structure where the load rests on the first platform and a lowered position, and a second movable platform connected to the support structure, said second movable platform movable independently of the first movable platform between a raised position where a first side of the second movable platform is coplanar with the second load supporting structure such that the load may be supported on the first side of the second movable platform and the second load supporting structure where the load rests on the first platform and a lowered position, said first movable platform comprising a second surface and said second movable platform comprising a second surface where the second surface of the first movable platform is disposed coplanar with the second surface of the second movable platform when the first movable platform and the second movable platform are in the lowered position.

2. The cart of claim 1 wherein said first platform is mounted on wheels.

3. The cart of claim 1 wherein said support structure comprises a first pillar and a second pillar, said first movable platform extending between said first pillar and said second pillar.

4. The cart of claim 3 wherein said second movable platform extends between said first pillar and said second pillar.

5. The cart of claim 1 further comprising a third load supporting surface and a fourth load supporting surface; said third load supporting surface being coplanar with the first load supporting surface and said fourth load supporting surface being coplanar with the second load supporting surface.

6. The cart of claim 1 further including a rail removably secured to said first platform.

7. The cart of claim 1 further including a first member pivotably attached to said support structure movable between a retracted position and an extended position and a second member pivotably attached to said support structure movable between a retracted position and an extended position, said first member and said second member having coplanar support surfaces when said first member and said second member are in the extended position.

8. The cart of claim 7 further including a third member pivotably attached to said support structure movable between a retracted position and an extended position and a fourth member pivotably attached to said support structure movable between a retracted position and an extended position, said third member and said fourth member having coplanar support surfaces when said third member and said fourth member are in the extended position.

9. The cart of claim 7 wherein a locking mechanism holds the first member and the second member in position.

10. The cart of claim 1 further including an adjustment assembly at each end of said first and second movable platforms for positioning the first and second movable platforms in the raised and lowered positions.

11. The cart of claim 1 where said first movable platform is connected to said support structure by an adjustment assembly comprising an arm pivotably connected to said support structure and defining a slot for slidably receiving a pin fixed to the first movable platform.

12. The cart of claim 11 wherein said adjustment assembly includes a handle.

13. The cart of claim 1 wherein said first movable platform and said second movable platform are removable from the cart.

14. The cart of claim 1 wherein a locking mechanism holds the first movable platform and the second movable platform in the raised position.

15. A cart comprising:
- a platform mounted on a plurality of wheels for transport over a surface;
- a first pillar mounted on the platform and defining a first load supporting surface and a second load supporting surface;
- a second pillar mounted on the platform and defining a third load supporting surface and a fourth load supporting surface, said first load supporting surface and said third load supporting surface being coplanar and said second load supporting surface and said fourth load supporting surface being coplanar such that said first and second pillars form an A-frame support structure such that a load supported on any of the first load supporting surface, said second load supporting surface, said third load supporting surface and said fourth load supporting surface rests on the platform;
- a first movable platform connected to said first and second pillars, said first movable platform movable between a raised position where a first side of the first movable platform is coplanar with the first load supporting structure and the third load supporting structure and a lowered position, and a second movable platform connected to said first and second pillars, said second movable platform movable independently of the first movable platform between a raised position where a first side of the second movable platform is coplanar with the second load supporting structure and the fourth load supporting structure and a lowered position, wherein when said first movable platform and said second movable platform are in said lowered positions, the first movable platform and the second movable platform are coplanar and form a single continuous support surface.

* * * * *